(12) United States Patent
Xiong et al.

(10) Patent No.: US 10,994,408 B2
(45) Date of Patent: May 4, 2021

(54) DEVICE CAPABLE OF SIMULATING LIMB OF HUMANOID ROBOT

(71) Applicant: UBTECH Robotics Corp, Shenzhen (CN)

(72) Inventors: Youjun Xiong, Shenzhen (CN); Weining Zhang, Shenzhen (CN); Hailei Li, Shenzhen (CN); Guangjun Hei, Shenzhen (CN)

(73) Assignee: UBTECH ROBOTICS CORP, Shenzhen (CN)

(*) Notice: Subject to any disclaimer, the term of this patent is extended or adjusted under 35 U.S.C. 154(b) by 402 days.

(21) Appl. No.: 16/231,514

(22) Filed: Dec. 23, 2018

(65) Prior Publication Data

US 2019/0240829 A1 Aug. 8, 2019

(30) Foreign Application Priority Data

Feb. 2, 2018 (CN) .......................... 201810107898.0

(51) Int. Cl.
*B25J 9/00* (2006.01)
*B25J 13/08* (2006.01)
*B25J 9/16* (2006.01)

(52) U.S. Cl.
CPC ........... *B25J 9/0006* (2013.01); *B25J 9/1694* (2013.01); *B25J 13/085* (2013.01)

(58) Field of Classification Search
CPC ...... B25J 9/0006; B25J 13/085; B25J 9/1694; B25J 19/007; B25J 9/106; B25J 19/0095; G01L 5/0042; G01L 5/226
See application file for complete search history.

(56) References Cited

U.S. PATENT DOCUMENTS

| | | | | |
|---|---|---|---|---|
| 2011/0048651 | A1* | 3/2011 | Goth | E04F 10/0625 160/22 |
| 2017/0367852 | A1* | 12/2017 | Kazerooni | B25J 9/106 |
| 2018/0222042 | A1* | 8/2018 | Prussmeier | B25J 9/009 |
| 2018/0361595 | A1* | 12/2018 | Troy | G01B 11/002 |
| 2019/0240829 | A1* | 8/2019 | Xiong | B25J 9/0006 |
| 2019/0240831 | A1* | 8/2019 | Bonora | H01L 21/67781 |

* cited by examiner

*Primary Examiner* — Victor L MacArthur

(57) ABSTRACT

A device capable of simulating a limb of a humanoid robot includes a vertically arranged guiding rail, a lower block fixed to the lower end of die guiding rail, an upper block slidably connected to rail, a lower linkage bar rotatably coupled to the lower block, an upper linkage bar rotatably coupled to the upper block, a joint module located between and rotatably coupled to the lower linkage bar and the upper linkage bar, a sensor configured to measure a force exerted on the joint; and a data processing module electrically connected to the sensor and configured to receive data from the sensor to determine a value of the force.

10 Claims, 3 Drawing Sheets

DEVICE CAPABLE OF SIMULATING LIMB OF HUMANOID ROBOT

CROSS REFERENCE TO RELATED APPLICATIONS

This application claims priority to Chinese Patent Application No. 201810107898.0, filed Feb. 2, 2018, which is hereby incorporated by reference herein as if set forth in its entirety.

BACKGROUND

1. Technical Field

The present disclosure generally relates to robots, and particularly to a device capable of simulating a limb of a humanoid robot.

2. Description of Related Art

As technologies advance, humanoid robots have become more popular. Some humanoid robots are constructed in such a way that they mimic the human body, so they use actuators that perform like joints of humans. During the design and manufacturing of humanoid robots, it needs to conduct force analysis. For example, in order for a walking humanoid robot to have a better adaptability to different environments, it needs analyze the force exerted on knee joints of the robot so that design parameters can be adjusted accordingly. For a humanoid robot designed to lift a load with its arms, it needs to analyze the force exerted on elbow joints of the robot. It is thus desirable and useful to provide a device capable of simulating a limb of a humanoid robot and collecting data based on which an evaluation of the force exerted on the joints of the robot can be conducted.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
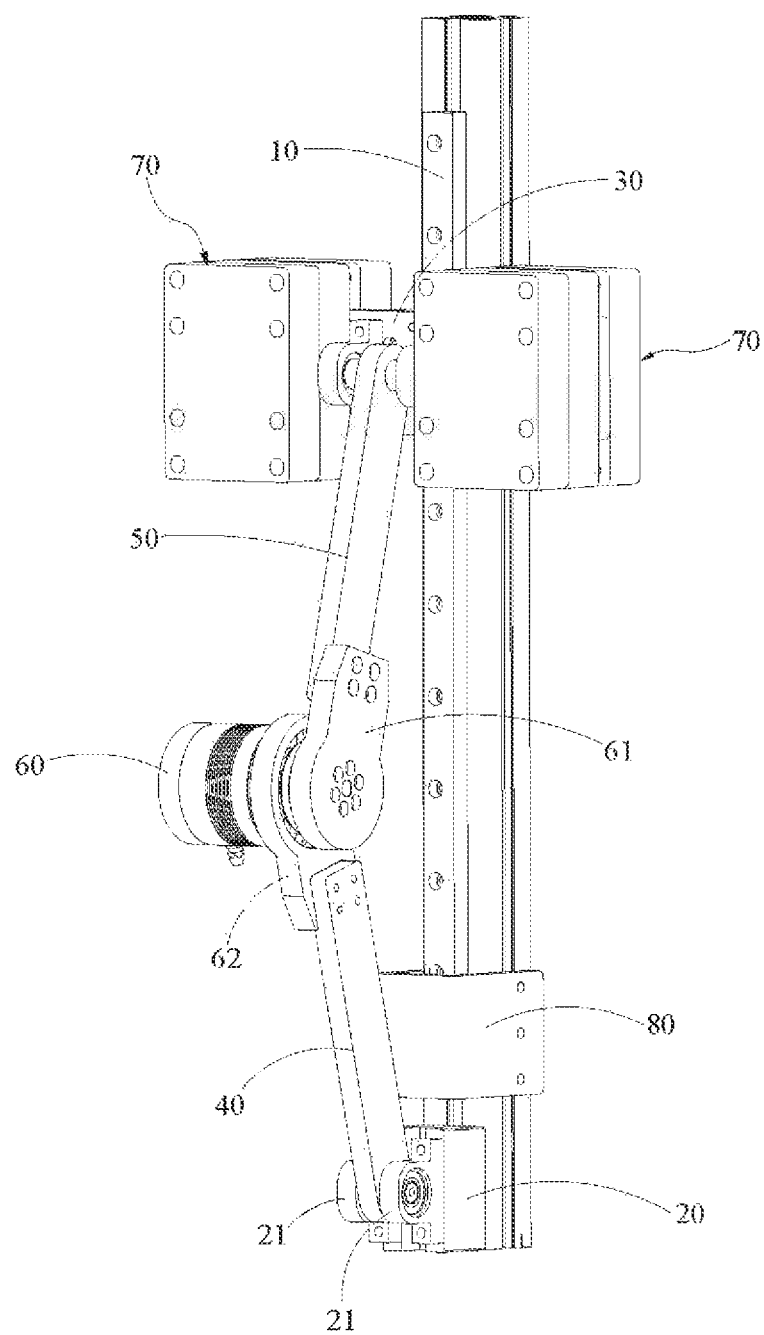
FIG. 1 is an isometric view of a device for simulating limb of a humanoid robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more unless expressly stated otherwise.

Figure 2:
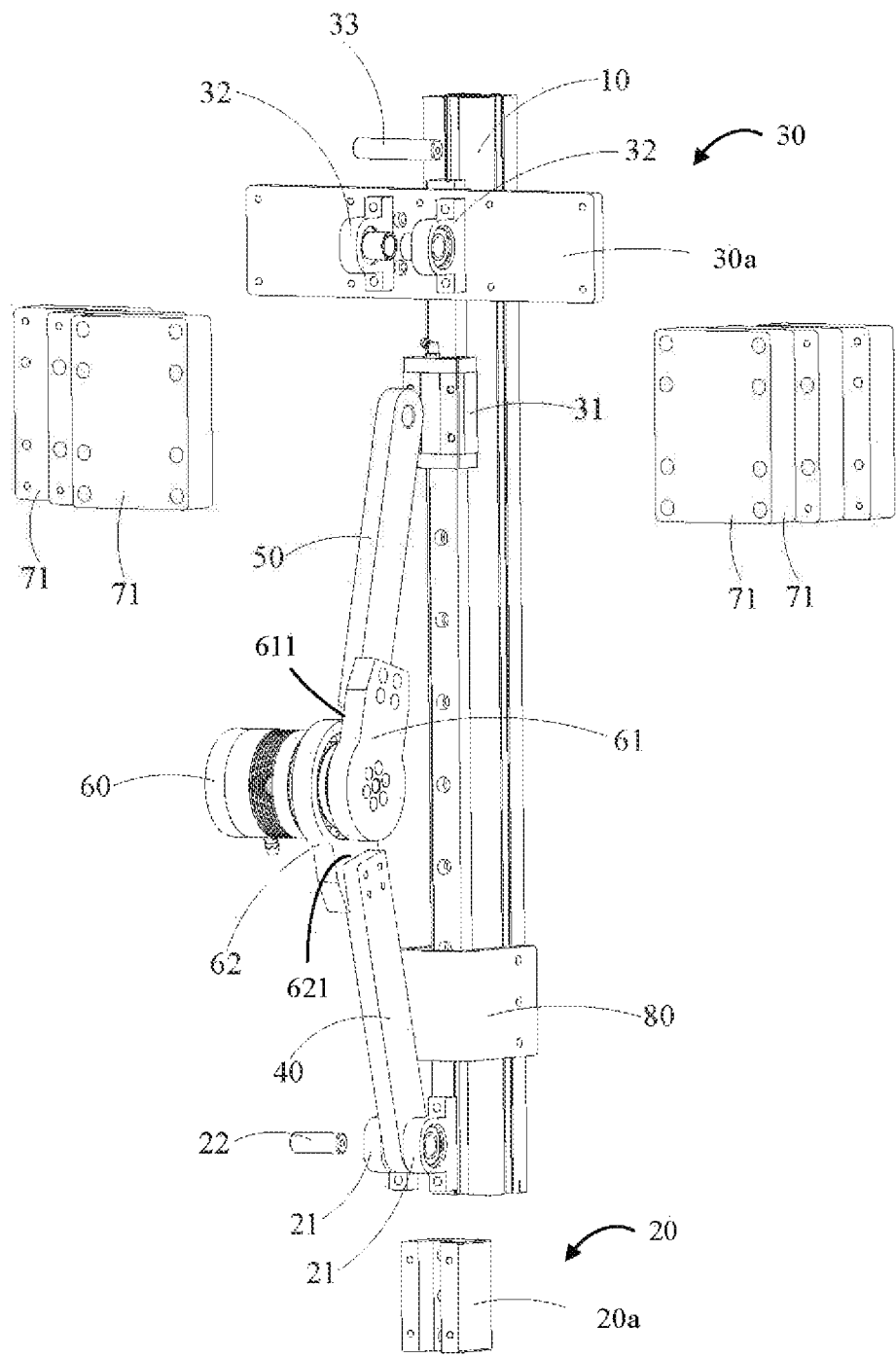
FIG. 2 is an isometric exploded view of the device of FIG. 1.
Figure 3:
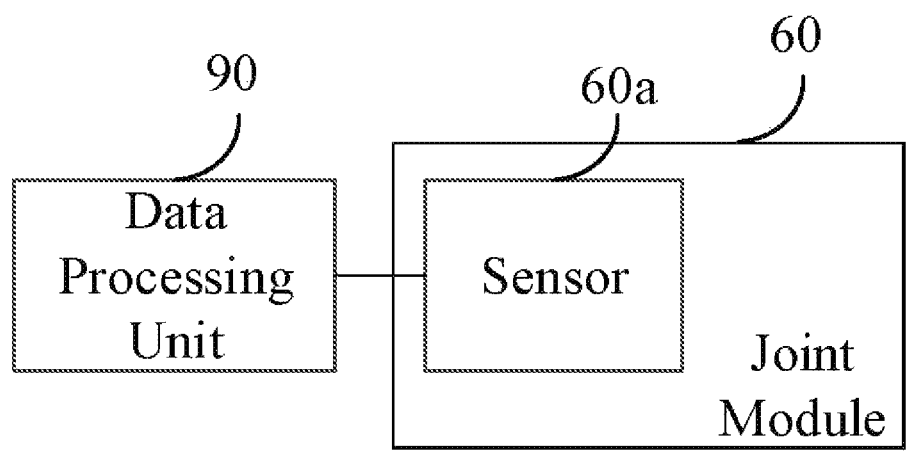
FIG. 3 is a schematic block diagram showing a data processing unit and a sensor of the device of FIG. 1.

Referring to FIGS. 1-3, a device for a humanoid robot according to one embodiment is used to simulates a limb of the humanoid robot and collect data based on which an evaluation of the force exerted on the joints of the robot can be conducted. The device includes a vertically arranged guiding rail 10, a lower block 20 fixed to the lower end of the guiding rail 10, an upper block 30 slidably connected to the rail 10, a lower linkage bar 40 rotatably coupled to the lower block 20, an upper linkage bar 50 rotatably coupled to the upper block 30, a joint module 60 located between and rotatably coupled to the lower linkage bar 40 and the upper linkage bar 50 and a data processing module 90 electrically connected to the joint module 60. The device further includes a sensor 60a to measure a force exerted on the joint module 60. The data processing module 90 can receive data from the joint module 60 to determine a value of the force.

With such configuration, the rail 10, the lower block 20, the upper block 30, the lower linkage bar 40, the upper linkage bar 50 and the joint module 60 constitute a slider-crank mechanism in which the lower linkage bar 40 serves as a crank, the upper linkage bar 50 serves a connecting rod, and the upper block 30 serves as a slider. The lower linkage bar 40 and the upper linkage bar 50 can thus rotate with respect to each other, which can simulate the flexion and extension of a limb of the humanoid robot. During the rotation of the lower linkage bar 40 and the upper linkage bar 50, the sensor 60a measures force exerted on the joint module 60 and sends data to the data processing module 90. The data processing module 90 can then determine a value of the force exerted on the joint module 60. The value of the force can then serve as a basis for evaluation of the force exerted on the joints of the humanoid robot. The device is simple in structure and easy to operate.

In one embodiment, the upper block 30 includes a main body 30a and a sliding block 31. The main body 30a is a rectangular flat plate fixed to the sliding block 31. The sliding block is slidably connected to the rail 10 and thus slidables on the rail 10. The upper block 30 can thus slide together with the sliding block 31 and drives the upper linkage bar 50 to move, which can simulate the flexion and extension of a leg of the humanoid robot. The lop end of the upper linkage bar 50 is rotatably connected to the upper block 30. The device further includes a load 70 fixed to the upper block 30. In the embodiment, the load 70 includes two load halves 71 that are fixed to the main body 30a and symmetrical with respect to the upper linkage bar 50 each load half 71 includes a number of flat blocks that are stacked on one another. In the embodiment, the two load halves 71 have the same number of flat blocks and thus have the same weight. In an alternative embodiment, the load halves 71 may have different number of flat blocks and may thus have different weight. The load halves 71 are fixed to the main body 30a via screws. One or more flat blocks can be added to or removed from the load halves 71 such that the load 70 can have a desired weight according to need, which allows the device lo simulate a leg of the robot to move under different load.

In one embodiment, the upper block 30 further includes two first bearings 32 fixed to the main body 30a and spaced apart from each other, and a first axle 33 rotatably connected to the main body 30a through the two first bearings 32. The top end of the upper linkage bar 50 is rotatably connected to the first axle 33. The lower block 20 a base 20a, two second bearings 21 fixed to the base 20a, and a second axle 22 rotatably connected to the base 20a through the two second bearings 21. The lower linkage bar 40 is rotatably connected to the second axle 22 at a bottom end thereof. With such configuration, the upper linkage bar 50 is rotatable with respect to the upper block 30 and the lower linkage bar 40 is rotatable with respect to the lower block 20.

In one embodiment, in order for a better simulation of a limb of the robot, an axis of the first axle 33 and an axis of the second axle 22 are parallel to each other and located on a vertical plane.

In one embodiment, the joint module 60 includes a first flange 61 and a second flange 62 that are rotatably to each other. The upper linkage bar 50 is fixed to the first flange 61 at a bottom end thereof, and the lower linkage bar 40 is fixed to the second flange 62 at a top end thereof. The first flange 61 includes a first end face 611 facing toward the joint module 60, and the second flange 62 includes a second end face 621 facing away from the joint module 60 and facing toward the first end face 611. The bottom end of the upper linkage bar 50 is connected to the first end face 611, and the top end of the lower linkage bar 40 is connected to the second end face 621. With such configuration, the device can simulate the motion of an upper leg and a lower leg with respect to a knee joint of the robot well, or can simulate the motion of an upper arm and a lower arm with respect to an elbow joint of the robot well.

In one embodiment, the joint module 60 serves as torque input device and includes therein a driving device to drive the upper linkage bar 50 and the lower linkage bar 40 to rotate with respect to each other. In an alternative embodiment, the joint module 60 may serve only as a joint to rotatably connected the upper linkage bar 50 and the lower linkage bar 40 together at their ends, and an external driving device is connected to the joint module 60 so as to drive the upper linkage bar 50 and the lower linkage bar 40 to rotate with respect to each other.

In one embodiment, the joint module 60 further includes therein a speed/acceleration adjusting element to adjust an output rotational speed/acceleration of the driving device so that the device can simulate flexion and extension of a limb of the humanoid robot at different speed/acceleration, which allows the sensor 60a to collect comprehensive data associated with the joint module 60.

In one embodiment, the device further includes a stopper member 80 fixed to the guiding rail 10 and located between the lower linkage bar 40 and the guiding rail 10. The stopper member 80 is used to prevent the lower linkage bar 40 from bumping into the guiding rail 10. That is, during rotation of the lower linkage bar 40 toward the guiding rail 10, when rotating to position where the lower linkage bar 40 comes into contact with the stopper member 80, the lower linkage bar 40 and the upper linkage bar 50 are stopped from further rotating toward the guiding rail 10. Thus, the lower linkage bar 40 and the upper linkage bar 50 will not bump into the guiding rail 10 during their rotation, and the guiding rail 10 is thus protected. In the embodiment, the stopper member 80 is made of elastic material and can absorb shock caused when the lower linkage bar 40 comes into contact with the stopper member 80. The stopper member 80 is located adjacent to the lower block 20.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A device capable of simulating a limb of a humanoid robot, the device comprising:
    a vertically arranged guiding rail comprising an upper end and a lower end;
    a lower block fixed to the lower end of the guiding rail;
    an upper block slidably connected to the rail;
    a lower linkage bar rotatably coupled to the lower block;
    an upper linkage bar rotatably coupled to the upper block;
    a joint module located between and rotatably coupled to the lower linkage bar and the upper linkage bar;
    a sensor configured to measure a force exerted on the joint; and
    a data processing module electrically connected to the sensor and configured to receive data from the sensor to determine a value of the force.

2. The device according to claim 1 further comprising a load, wherein the upper linkage bar comprises a top end rotatably coupled to the upper block, and the load is fixed to the upper block.

3. The device according to claim 2, wherein the upper block comprises a main body, two first bearings fixed to the main body and spaced apart from each other, and a first axle rotatably connected to the main body through the two first bearings, and the top end of the upper linkage bar is rotatably connected to the first axle.

4. The device according to claim 3, wherein the lower block comprises a base, two second bearings fixed to the base, and a second axle rotatably connected to the base through the two second bearings, and the lower linkage bar is rotatably connected to the second axle at a bottom end thereof.

5. The device according to claim 4, wherein an axis of the first axle and an axis of the second axle are parallel to each other and located on a vertical plane.

6. The device according to claim 1, wherein the joint module comprises a first flange and a second flange that are rotatably to each other, the upper linkage bar is fixed to the first flange at a bottom end thereof, and the lower linkage bar is fixed to the second flange at a top end thereof.

7. The device according to claim 6, wherein the first flange comprises a first end face, the second flange comprises a second end face opposing the first end face, the bottom end of the upper linkage bar is connected to the first end face, and the top end of the lower linkage bar is connected to the second end face.

8. The device according to claim 1, wherein the joint module comprises therein a driving device to drive the upper linkage bar and the lower linkage bar to rotate with respect to each other.

9. The device according to claim 8, wherein the joint module comprises therein a speed adjusting element to adjust an output rotational speed of the driving device.

10. The device according to claim 1, further comprising a stopper member fixed to the guiding rail and located between the lower linkage bar and the guiding rail, the stopper member is configured to prevent the lower linkage bar from bumping into the guiding rail.

* * * * *